Oct. 5, 1954          M. KAPLAN               2,691,131
           TESTING APPARATUS FOR CATHODE-RAY TUBES AND CIRCUITS
                            Filed Jan. 31, 1952
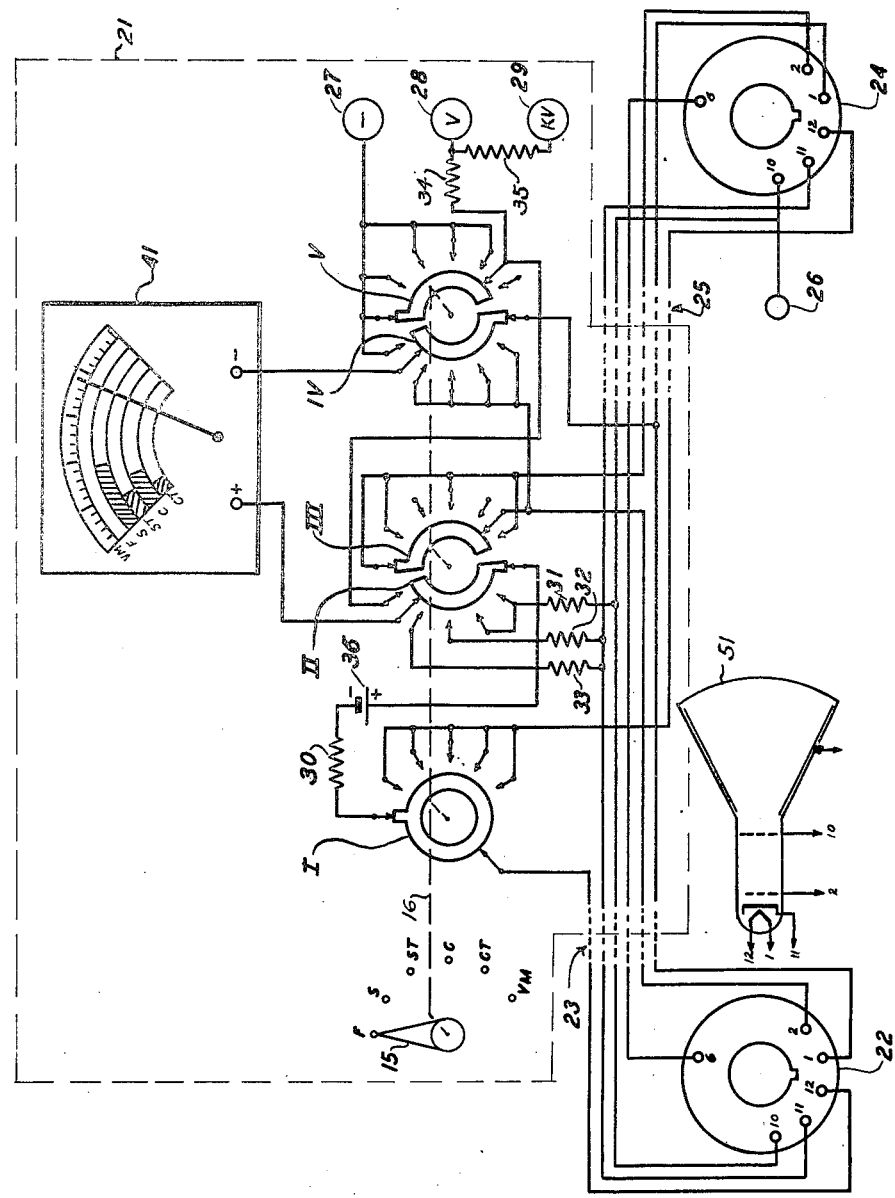
MARVIN KAPLAN
INVENTOR.
BY Darby + Darby
ATT'YS Patented Oct. 5, 1954

2,691,131

UNITED STATES PATENT OFFICE 2,691,131

TESTING APPARATUS FOR CATHODE-RAY TUBES AND CIRCUITS

Marvin Kaplan, New Hyde Park, N. Y., assignor to Video Television, Inc., Long Island City, N. Y., a corporation of New York Application January 31, 1952, Serial No. 269,265

12 Claims. (Cl. 324—23)

The present invention relates to the art including testing apparatus especially adapted for testing cathode ray tubes and their circuits.

With the present rapid development and expansion of the television broadcast industry, by which nearly 15 million television receivers are now in use, it has become imperative to provide simple and inexpensive testing apparatus by which it can be readily determined in the field whether or not the cathode ray or picture tube of the receiver is operating satisfactorily. Failure to obtain an image on the picture tube screen may be due to many causes, and particularly to a defect in the tube itself or in its supply circuits. In the past, when a service man has been unable to trace the source of trouble, it is often times ascribed to failure within the picture tube, which the service man cannot readily check, whereupon the tube is withdrawn from the set and returned to the tube manufacturer usually under the customary tube warranty. In a large percentage of these instances it has been found that the tube itself is in no way defective, and is returned by the manufacturer to the service man for reinstallation in the set. These instances, of course, constitute an unnecessary expense and burden to all parties concerned.

In addition, it is important for tube manufacturers to have an easy and simple apparatus for testing cathode ray tubes as they come off the production line, so as to be able to weed out defective tubes before shipment to receiver manufacturers or to tube distributors, since such defective tubes bearing the normal manufacturer's warranty when returned constitute a burdensome item of expense.

The present invention provides a simple apparatus for the method of checking cathode ray or picture tubes and their voltage supply circuits. In particular, the present testing apparatus is useful in determining whether the cathode ray tube itself is defective, whether the voltages supplied to it are improper or whether the customary ion trap magnet is out of adjustment. In addition, in a very simple manner the instrument is also adapted for use as a sensitive high voltage voltmeter to track down and positively determine the cause of supply voltage failures which may be determined to exist by use of the same instrument. Specifically, the present apparatus can determine whether the filament of the cathode is defective, whether proper emission exists, whether the voltage supply circuit for the screen grid electrode is defective, whether a short circuit exists within the tube, whether there has been a high voltage breakdown between the high voltage anode and other electrodes, whether the receiver brightness control circuit is operating satisfactorily, and whether the ion trap magnet is in proper position or is defective or if the high voltage anode supply is defective.

An important feature of the present invention is in the circuit for and method of checking for faults within the picture tube itself. When by the symptoms exhibited by a television receiver or cathode ray tube circuit it is conjectured that trouble exists within the picture tube or cathode ray tube, it is often times difficult to determine whether the conjecture is accurate merely by measuring the voltages appearing at the electrodes of the tube, since these voltages many times are not determinative one way or the other, and improper voltage may be caused by a defect in the voltage supply circuits. An important feature of the present invention is based upon my discovery that in a picture tube the voltage between a floating electrode disconnected from all source of voltage, and another electrode is indicative of the condition of operation of the tube. I have found that in present commercial tubes, when they are in proper operating condition, the voltage between the control grid when floating and the cathode will be within the range of approximately 0.5 to 2.0 volts, and similarly the voltage between such a floating control grid and the screen grid (or first accelerating electrode) will be between the limits of 75 to 450 volts. Similarly the voltage between the high voltage anode, when floating, and the screen grid will be between 200 and 500 volts. On the other hand, should the emission from the cathode be insufficient, or should there be an improper alignment of the electrodes so that insufficient electrons proceed through the control grid and screen grid, or should there be gas or leakage within the tube, or should there be a short circuit or voltage breakdown between electrodes within the tube, the voltage between the floating electrode and these other electrodes will be considerably lower than the values mentioned and, accordingly, these voltages can be used as an indication of defects within the tube. Accordingly, the method of and circuit for using a floating electrode for tube checking forms one feature of the present invention.

Other objects and advantages of the present invention will become more clearly apparent from consideration of the following specification, taken in conjunction with the appended drawing which in its single figure shows a schematic circuit diagram of a preferred form of the present invention.

Referring to the drawing, the present invention comprises a main casing or housing, indicated schematically by the dash line 21, a standard socket 22 coupled thereto by a cable 23 and a plug 24 similar to the standard picture tube base and coupled to the main casing 21 by a cable 25. This standard socket or base has 12 terminals or prongs, numbered 1 to 12 respectively in a counterclockwise direction starting at the customary locating key. In the present television receivers, only terminals 1, 2, 6, 10, 11 and 12 are customarily used, so that only these terminals are illustrated, although it will be understood that other terminals may be used where desired.

Within the casing 21 is a sensitive indicator or meter 41 which, for example, might be a conventional moving coil or D'Arsonval movement microammeter having, for example, a maximum scale reading at 100 microamperes. Meter 41 is provided with six concentric arcuate scales, designated respectively as F, S, ST, C, CT and VM, corresponding respectively to the six different modes of use of the present instrument. It will be noted that the VM scale is calibrated in a uniform 0 to 500 volt scale, while the remaining scales merely are separated into two ranges or regions which can be designated as "Bad" or "Good," and may be suitably labelled or color coded. In the figure, the "Bad" ranges are designed by cross-hatching.

Associated with the meter 41 is a multi-position selector switch 15 having five sections I to V respectively, all being gang-operated from the same shaft indicated at 16. The selector switch 15 has six positions labelled respectively F, S, ST, C, CT and VM, in correspondence with the six meter scales.

In the figure, there is also shown schematically the picture tube 51, with each of its electrodes having leads or terminals designated in correspondence with the number of the terminals or prongs of socket 22 and plug 24. Thus, the filament terminals are 1 and 12; the cathode is terminal 10; the control grid is terminal 2; the screen grid or accelerating grid or first (low voltage) anode is 11.

The remainder of the elements and the connections of the present circuit will be described in detail in connection with the description below of the operation and use of the instrument for each of its several selector switch positions.

As is well known, the conventional television receiver has a picture tube or cathode ray tube suitably supported either on the chassis or from the cabinet in a generally horizontal position with the tube base extending to the rear. Connections are made to the tube by means of a socket supported by the tube base when in engagement therewith and coupled to the chassis by a suitable cable or set of wires. In using the present instrument the picture tube socket is disengaged from the picture tube base, and that socket is instead engaged with the plug 24 of the instrument which is coupled to the main body 21 of the instrument by the cable 25. Also, the socket 22 of the instrument, which is similarly coupled to the main body 21 of the instrument by means of cable 23, is engaged with the picture tube base. The connection of the plug 24 and socket 22 in this manner interposes the instrument in the receiver or other circuit between the picture tube and its sources of potential, and permits the instrument to indicate the condition of the tube and its voltage supplies as will now be described.

The five sections of the selector switch 15 have respectively different functions. Section I serves only to connect filament terminal 12 of the picture tube 51 either in series with resistor 30, battery 36 and meter 41 in position F, or else directly to prong 12 of the plug 24 and thereby to terminal 12 of the receiver socket for energizing the filament when the selector 15 is in the other positions, it being noted that filament terminal 1 is fixedly connected to its source of voltage.

Section II of the selector switch 15 serves to connect the positive terminal of the meter 41 to various portions of the instrument circuit for making the measurements to be described.

Section III of the selector switch 15 serves to connect the control grid electrode 2 of the picture tube 51 either to the corresponding terminal of the picture tube socket so as to supply excitation to it (in positions F, S, C and VM) or else to leave it open circuited (in positions ST and CT).

Section IV of the selector switch 15 serves to connect the negative terminal of the meter 41 to various portions of the instrument circuit as described below.

Section V of the selector switch 15 serves to connect the positive meter terminal through resistor 34 to output terminal 28 described below (in position VM) or to short circuit the terminals 27 and 28 in all other positions.

In position F of the selector 15, which is that illustrated in the figure, the instrument is connected to indicate filament continuity. In this position the positive terminal of the meter 41 which is continuously connected to the movable contact of switch section II is thereby connected to a source 36 of fixed potential, such as of the order of 1.5 volts and then through a current limiting resistor 30 and thence to the tube filament terminal 12. The negative terminal of meter 41 is connected through selector section IV to the socket terminal 1 and thereby to the other tube filament terminal 1. It will be noted that in this position of the selector switch 15 the prong 12 of the picture tube and of socket 22 are isolated from the corresponding terminal of plug 24, so as to cut off the filament voltage supply of the receiver chassis. The only supply for the picture tube filament is hence from the voltage source 21. If the filament is continuous, a complete circuit is made by which current flowing through the filament will also flow through the meter 41, supplying an indication thereon. The meter 41 is provided with a scale F having "Good" and "Bad" ranges. Battery 21 and resistor 20 are so selected, in accordance with well known principles, in correspondence with the customary filament resistances and the sensitivity of meter 41, so that for a filament in perfect condition the meter will read somewhere between one-half and full scale reading as may be desired. Preferably this reading for perfect filament is chosen to be close to full scale reading so that, if a dry cell be used as the voltage source 21, allowance may be made for gradual diminishing of the terminal voltage of the battery with life. Under these circumstances the circuit is preferably designed so that, with a perfect filament, if the battery diminishes to the point where only a half scale reading is obtained, that supplies an indication that the battery should be replaced. The "Good" range is correspondingly marked.

On the other hand, if no reading is obtained with this setting of the instrument, an indication is provided that the filament is open circuited which, of course, indicates the defect sought after. On the other hand, extraordinarily low values of resistance shown by off-scale indication, may indicate certain exceptional troubles, such as a partial short-circuit of the filament or the like.

In position S of the selector switch, the instrument is adapted to indicate the voltage at the terminal of the screen grid 10 of the tube 51. In this position, all plug terminals are directly connected to the corresponding socket terminals; thus section I connects terminals 12 and section III connects terminals 2, while all other terminals are directly interconnected. Hence the entire tube is excited from the receiver chassis.

Section II of the selector switch 15 in this position S connects the positive terminal of the meter 41 through resistor 31 to screen grid electrode 10. The negative terminal of meter 41 is connected by section IV of the selector switch 15 to control grid electrode 2. Accordingly, in this position S the meter 41 with its series resistor 31 functions essentially as a voltmeter to measure the control grid to screen grid voltage under full excitation.

The resistor 31 is selected in correspondence with the sensitivity of meter 41 in accordance with well known principles, so that for the largest screen grid voltage normally encountered, the meter will read nearly or at full scale. The scale S of meter 41 has two ranges, the "Bad" range being shown cross-hatched. The dividing line between the "Good" and the "Bad" range is selected to be just below the lowest acceptable value of screen grid voltage.

In use at this selector position S, the receiver is turned on and its brightness control is turned fully counterclockwise for minimum brightness. If the meter reading is on the "Good" section of the S scale, the screen grid voltage is normal, indicating no trouble in the voltage supply from the receiver to the picture tube. If the meter reading is in the "Bad" section of the S scale, then either the supply voltage is abnormal or some internal trouble exists within the picture tube. If such is the case, the receiver tube socket is disconnected from the plug 24, the selector switch 15 is turned to the VM position and, in the manner described below, the voltage of the screen supply can be directly measured by using the VM scale of the meter 41, to determine whether the voltage supply is defective. If it is not, then the trouble is in the tube.

In the selector position ST, the connections are the same as in position S, except that selector section III disconnects terminal 2 of socket 22 from terminal 2 of plug 24, so that the tube control grid is left floating with no potential applied thereto. In this position, the picture tube is tested for its conductance between the control electrode 2 and screen grid 10. I have discovered that for normal picture tubes, even with the control grid disconnected from its circuit, there is a normal voltage of between 75 and 450 volts between the floating control grid and the screen grid, apparently due to a potential induced on the control grid by passage of the electron stream therethrough. If the electron flow is sub-normal (as, for example, due to poor emission or improper ion trap magnet alignment or short circuit or high conductance between tube electrodes), this voltage will be low, and the meter 41 will register in the cross-hatched "Bad" range on scale ST. If the conductance is normal and there is no leak, gas or short circuit present, the meter reading will be "Good" on the ST scale. If the reading is "Bad" on the ST scale, but "Good" on the S (and C) scales, then the tube is defective. If the S and ST readings are both "Bad," then the screen grid supply voltage is generally at fault. If there is a negative reading, it is usually caused at a high voltage breakdown between the high voltage anode and the electron gun, this indicating a defective tube.

In position C the instrument is adapted to measure the voltage between cathode 11 and the control grid 2. All tube electrodes are fully energized, and the positive terminal of meter 41 is connected by selector switch section II through resistance 32 to the cathode 11 of the picture tube. The negative terminal of meter 41 is connected through selector section IV to the control grid 2.

The resistor 32 is chosen to give nearly full scale reading with the maximum grid bias voltage normally encountered, for example, with a 100 microampere meter movement, resistor 32 may have a value of 1 megohm. With the receiver brightness control at full counterclockwise position, a "Good" reading on the C scale indicates a normal brightness control circuit. By rotating the brightness control to full clockwise position, a check is made of the brightness control voltage. In proper operation there should be a variation of at least ⅓ of the meter reading on the C scale. If not, the brightness control circuit is at fault.

In the CT position the instrument is connected similarly to the C position, but with the control grid 2 now floating, while the remaining tube electrodes are normally excited. The series resistor 32 is here replaced by a different resistor 33, of lower resistance (being 4,700 ohms in the above example) to permit indication of the floating control grid to cathode voltage, which, as indicated above, I have found rests between one-half and two volts for normal tubes.

The meter 41 and resistor 33 thus forms a voltmeter connected between the control grid electrode 2 and the cathode 11. With the receiver brightness control fully counterclockwise the instrument then checks for conductance, short circuit or leakage between the cathode and control grid. If the conductance is normal and if there is no leakage or short circuit present, the meter reading will be "Good" on the CT scale. If the reading is "Bad," the cathode ray tube is defective.

If the S, ST, C and CT positions all test "Good" and the cathode ray tube is still not in operation, the trouble will probably be in the high voltage anode circuit of the receiver or in the anode section of the tube. In order to determine which of these is the cause of the trouble, the selector switch is turned to position VM. In this position all of the tube electrodes are energized. The positive terminal of meter 41 is connected through a resistance 34 to the jack 28 of the instrument. The negative terminal of meter 41 is connected to the jack 27. In this position meter 41 and resistor 34 provide a direct reading voltmeter completely isolated from the tube and its circuit, and can be used as a separate voltmeter for any voltage checks which may be desirable. For example, the resistor 34 may provide a direct reading 0–500 volt range.

To check beam current and the high voltage anode, in the VM position the high voltage anode terminal of the picture tube is disconnected from the receiver, and the meter 41 has its negative terminal connected thereto by way of jack 27. The positive jack 28 is connected to the screen grid 10 by way of a jack 26 which may be mounted on plug 24 and connected to its prong 10. The ion trap magnet of the receiver is adjusted for maximum indication, and the brightness control is placed at full clockwise position. If the reading of the meter is less than 100 volts on the 500 volt scale, the tube is defective. If it is between 100 and 200 volts the tube is poor, while for a good tube the reading will be greater than 200 volts.

Also, the ion trap magnet may be adjusted to proper position by making the same connections just described and rotating the magnet to maximum position. If the magnet does not vary the indication by at least a 2 to 1 ratio, the magnet is defective.

To test for the receiver high voltage, with the high voltage lead connected to the high voltage anode of the picture tube, jack 27 is connected to the receiver chassis and a lead from jack 29 is connected to the high voltage anode terminal on the cathode ray tube. As will be seen, meter 41 in series with resistors 34 and 35 then becomes a high voltage voltmeter and may be calibrated, for example, to read up to 15,000 volts. When the receiver is now turned on with the brightness control at the maximum clockwise position the reading should be between 7 and 15 thousand vol s,depenigtdnTtmtr
thousand volts, depending upon the manufacturer's rating for the tube or set. If the reading is about ½ or normal, a second reading should be taken between the high voltage anode terminal of the circuit when disconnected from the tube, which gives a no load measurement. If the second reading is still low, then the high voltage supply circuit is at fault. If the second reading is normal, though the first low, then the tube is defective due to a high voltage breakdown within the tube.

The present instrument, therefore, provides a multitest apparatus capable of testing most of the ordinarily encountered troubles in a television receiver relating to the picture tube or its power supply. As indicated above, in position F the apparatus serves as a continuity tester and ohm meter for the filament. In position S, the instrument serves as a simple volt meter for the screen grid circuit to indicate the voltage between the screen grid 10 and the control grid 2. In a normal circuit this voltage is substantially the same as the screen grid voltage and since it is directly correlated to the screen grid voltage can serve as a direct measure of the supply voltage. In position ST the same measurement is made with the control grid electrode of the tube completely disconnected from its circuit, or "floating." The only way in which any voltage can appear on the voltmeter is, therefore, by virtue of the potential induced in the control grid by the electron stream. This provides a check on the electron gun structure, since, if there is any insufficiency of emission of the gun or any improper alignment of the electrodes in the gun which prevents electrons from reaching the control grid, that will be indicated by the absence of or low reading on the meter. This method of checking a cathode ray tube by determining the voltage between a floating control grid and the screen grid is one of the important features of the present invention.

In position C the instrument serves as a voltmeter to check the voltage between cathode and control grid. Since the bias between these two electrodes is adjusted by the brightness control, this provides a check on the brightness control circuit. In position CT the same voltage check is made, but with the control grid once more floating. Here again a check exists for the emission of electrons between the cathode and the control grid. If insufficient electrons are emitted or if although emitted they do not for some reason travel along their intended path through the control grid, this will be indicated by a low reading on the voltmeter.

A further floating electrode measurement is made by having the high voltage anode floating and measuring the voltage between it and the screen grid.

Accordingly, in addition to providing voltage tests on various parts of the circuit and particularly at the electrode terminals of the cathode ray tube to determine and localize any faults in the circuit, the present invention provides a particularly useful method of and means for checking the internal structure and operation of the tube itself, by providing a voltage measurement or indication between a floating electrode and other electrodes.

The present invention also provides apparatus for checking cathode ray tubes apart from television receivers. A voltage supply source may be provided, which produces the necessary normal voltages for the various tube electrodes. This source may be connected to a conventional cathode ray tube socket, with the voltage for each electrode connected to the numbered terminal corresponding to that electrode. Then the above-described instrument is connected between that socket and the tube under test, and the tests indicated above are performed. Since the power supply is then known to be in proper condition, any defects which show up are attributable to the tube alone. In this way, a simple method of and apparatus for testing such tubes is provided, which may be utilized by tube manufacturers or service organizations.

Since many changes could be made in the above construction and many apparently widely different embodiments of this invention could be made without departing from the spirit thereof, it is intended that all matter contained in the above description or shown in the accompanying drawings shall be interpreted as illustrative only and not in a limiting sense, the present invention being defined solely by the appended claims.

I claim:

1. A tester and circuit analyzer for cathode ray tubes and their circuits comprising a voltage indicator, a test plug adapted to be inserted in the socket of a cathode ray tube and circuit to be tested, a test socket adapted to receive the base of a cathode ray tube under test, said socket and plug each having two filament terminals, a cathode terminal, a control grid terminal and a screen grid terminal, said plug and socket cathode screen grid and one filament terminal being directly interconnected, and six-position selector means for selectively (a) coupling one filament terminal of said instrument socket either to a terminal of said indicator through a series resistor and voltage source in a first position of said selector or directly to the corresponding filament terminal of said instrument plug in the remaining five positions of said selector; (b) connecting said one terminal of said indicator selectively to said voltage source in said first selector position, through a second resistor to the screen grid terminals of said test socket and plug in second and third positions of said selector, through a third resistor to the cathode terminals of said test socket and plug in a fourth selector position, through a fifth resistor to said cathode terminals in a fifth position, or to an output terminal in said selector sixth position; (c) selectively connecting the control grid terminal of said socket to the control grid terminal of said plug in said selector first, second, fourth and sixth positions and disconnecting said two control grid terminals from each other in said selector third and fifth positions; (d) selectively connecting the other terminal of said indicator to the other filament terminal of said test socket and plug in said first selector position, or to said test socket control grid terminal in said selector second, third, fourth and fifth positions, or to a second output terminal in said selector sixth position; and (e) selectively interconnecting said first and second output terminals in said selector first, second, third, fourth and fifth positions and disconnecting said output terminals from each other in said selector sixth position; whereby upon coupling said test socket to a tube to be tested and upon coupling said test plug to the normal circuit socket for said tube, said indicator is adapted to indicate the condition of operation of said tube and of the voltage sources for said tube.

2. A tester and circuit analyzer for cathode ray tubes and their circuits comprising a voltage indicator, a test plug adapted to be inserted in the socket of a cathode ray tube and circuit to be tested, a test socket adapted to receive the base of a cathode ray tube under test, said socket and plug each having a cathode terminal, a control grid terminal and a screen grid terminal, said plug and socket cathode and screen grid terminals being directly interconnected, and multi-position selector means for selectively (a) connecting said one terminal of said indicator selectively through a first resistor to the screen grid terimnals of said test socket and plug in first and second positions of said selector, through a second resistor to the cathode terminals of said test socket and plug in a third selector position, through a fourth resistor to said cathode terminals in a fourth position, or to an output terminal in said selector fifth position; (b) selectively connecting the control grid terminal of said test socket to the control grid terminal of said plug in said selector first, third and fifth positions and disconnecting said two control grid terminals from each other in said selector second and fourth positions; (c) selectively connecting the other terminal of said indicator to said test socket control grid terminal in said selector first, second, third and fourth positions, or to a second output terminal in said selector fifth position; and (d) selectively interconnecting said first and second output terminals in said selector first, second, third and fourth positions and disconnecting said output terminals from each other in said selector fifth position; whereby upon coupling said test socket to a tube to be tested and upon coupling said test plug to the normal circuit socket for said tube, said indicator is adapted to indicate the condition of operation of said tube and of the voltage sources for said tube.

3. A tester and circuit analyzer for cathode ray tubes and their circuits, comprising a voltage indicator, a test plug adapted to be inserted in the socket of a cathode ray tube and circuit to be tested, a test socket adapted to receive the base of a cathode ray tube under test, said socket and plug each having cathode, control grid and screen grid terminals, said plug and socket cathode and screen grid terminals being directly interconnected, and multi-position selector means for selectively (a) interconnecting each terminal of said socket and with its corresponding terminal of said plug and connecting said indicator between said control grid terminals and either said cathode or said screen grid terminals; or (b) respectively intercoupling said cathode and screen grid terminals of said plug and socket while maintaining said test socket control grid terminal disconnected from any source of potential, and connecting said voltage indicator between said test socket control grid terminal and one of said test socket cathode or screen grid terminals, whereby upon coupling said test socket to a tube to be tested and upon coupling said test plug to the normal circuit socket for said tube under test, said indicator is adapted to indicate the condition of operation of said tube and of the voltage sources for said tube.

4. A tester and circuit analyzer for cathode ray tubes and their circuits, comprising a voltage indicator, a test plug adapted to be inserted in the socket of a cathode ray tube and circuit to be tested, a test socket adapted to receive the base of a cathode ray tube under test, said test socket and plug each having two filament terminals, a cathode terminal, a control grid terminal and a screen grid terminal, means interconnecting all said terminals respectively except said control grid terminals, whereby the control grid terminal of said test socket is left floating, and means selectively connecting said indicator between said test socket control grid terminal and either said interconnected cathode terminals or said interconnected screen grid terminals, whereby upon coupling said test socket to a tube to be tested and upon coupling said test plug to a socket connected to respective sources of potential for the respective electrodes of said tube, said indicator is adapted to indicate the condition of operation of said tube.

5. A tester and circuit analyzer for cathode ray tubes and their circuits comprising a voltage indicator, a test plug adapted to be inserted in the socket of a cathode ray tube and circuit to be tested, a test socket adapted to receive the base of a cathode ray tube under test, said test socket and plug each having two filament terminals, a cathode terminal, a control grid terminal and a screen grid terminal, means directly interconnecting each of said plug terminals to a respective one of said test socket terminals, except for the control grid terminals thereof, whereby the control grid terminal of said socket is left floating, and means coupling said indicator between said test socket control grid terminal and another terminal of said test socket.

6. A tester and circuit analyzer as in claim 5 wherein said other terminal is the cathode terminal.

7. A tester and circuit analyzer as in claim 5 wherein said other termnial is said screen grid terminal.

8. The method of determining defects in a cathode ray tube having cathode, control grid, screen grid and high voltage anode electrodes, comprising the steps of supplying normal operating potentials to all electrodes of said tube except said control grid electrode, and measuring the voltage between said control grid electrode and another electrode of said tube, said measured voltage being indicative of the presence or absence of certain defects in said tube.

9. The method of locating defects in cathode ray tubes having cathode, control grid, screen grid and high voltage anode electrodes, comprising the steps of providing normal operating potentials to all electrodes of said tube except said high voltage anode, and measuring the voltage between said high voltage anode and said screen grid electrode, said voltage being indicative of the condition of said cathode ray tube.

10. The method of locating defects in cathode ray tubes having cathode, control grid, screen grid and high voltage anode electrodes and also having an ion trap magnet, comprising the steps of providing normal operating potentials to all of said electrodes except said high voltage anode, applying a voltage-indicating instrument between said screen grid electrode and said high voltage anode with the positive terminal of said instrument connected to said screen grid electrode, and adjusting said ion trap magnet for maximum voltage reading of said instrument, said maximum reading being indicative of the condition of said cathode ray tube.

11. The method of adjusting the ion trap magnet on a cathode ray tube having an ion trap, a screen grid electrode and a high voltage anode electrode, comprising the steps of applying normal operating potentials to all said electrodes of said cathode ray tube except said high voltage anode, applying a voltage indicator between said high voltage anode and said screen grid electrode, and adjusting said ion trap magnet to provide maximum reading on said indicator.

12. The method of checking the ion trap magnet on a cathode ray tube having an ion trap, a screen grid electrode and a high voltage anode electrode, comprising the steps of applying normal operating potentials to all electrodes of said tube except said high voltage anode, applying a voltage indicator between said anode and said screen grid, and adjusting said ion trap magnet to vary the indication of said indicator from maximum to minimum, whereby the range of variation of said indication indicates the condition of said magnet.

References Cited in the file of this patent

UNITED STATES PATENTS

| Number | Name | Date |
| --- | --- | --- |
| 2,075,415 | Williams | Mar. 30, 1937 |
| 2,133,610 | Fausett | Oct. 18, 1938 |
| 2,172,953 | Buchard | Sept. 12, 1939 |
| 2,217,925 | Triplett | Oct. 15, 1940 |
| 2,264,066 | Buchard | Nov. 25, 1941 |
| 2,532,759 | Coate | Dec. 5, 1950 |
| 2,590,116 | Moland et al. | Mar. 25, 1952 |